(12) United States Patent
Deshpande et al.

(10) Patent No.: US 12,468,784 B2
(45) Date of Patent: Nov. 11, 2025

(54) SYSTEMS AND METHODS SUPPORTING COMPOSABLE SYSTEM ARCHITECTURES

(71) Applicant: Accenture Global Solutions Limited, Dublin (IE)

(72) Inventors: Amod Dattatray Deshpande, Pune (IN); Kiran Raghunath Sathvik, Bangalore (IN); Payal Panda, Bangalore (IN); Raghavan Tinniyam Iyer, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 224 days.

(21) Appl. No.: 18/454,712

(22) Filed: Aug. 23, 2023

(65) Prior Publication Data

US 2025/0068703 A1 Feb. 27, 2025

(51) Int. Cl.
*G06F 21/10* (2013.01)
*G06F 8/60* (2018.01)
*G06F 16/248* (2019.01)
*G06F 21/60* (2013.01)

(52) U.S. Cl.
CPC ............ *G06F 21/1014* (2023.08); *G06F 8/60* (2013.01); *G06F 16/248* (2019.01); *G06F 21/602* (2013.01)

(58) Field of Classification Search
CPC .. G06F 21/1014; G06F 21/602; G06F 16/248; G06F 8/60
See application file for complete search history.

(56) References Cited

U.S. PATENT DOCUMENTS

| | | | |
|---|---|---|---|
| 9,430,858 B1 * | 8/2016 | Har | G06T 11/206 |
| 11,416,474 B2 * | 8/2022 | Ponceleon | G06F 16/2379 |
| 11,907,238 B2 * | 2/2024 | Steinhauser | G06F 16/2455 |
| 2005/0289099 A1 * | 12/2005 | Gromyko | G06F 16/332 |
| 2020/0134139 A1 * | 4/2020 | Vaish | G06F 16/1805 |

* cited by examiner

*Primary Examiner* — Clayton R Williams
(74) *Attorney, Agent, or Firm* — Mannava & Kang, P.C.

(57) ABSTRACT

The invention provides a platform for evaluating and distributing packaged software capabilities. The packaged software capabilities described herein may be discrete pieces of software designed to perform a specific task and multiple packaged software capabilities may be combined to create larger functionality, such as an application. Packaged software capabilities may be analyzed using a variety of techniques to evaluate interoperability based on standard(s) to determine whether the packaged software capabilities support desired hardware, authentication, authorization, and the like. A catalog of packaged software capabilities satisfying the standard(s) may be created and the platform may provide a variety of techniques for searching the catalog based on search parameters to identify best fit packaged software capabilities meeting a user's needs.

18 Claims, 8 Drawing Sheets

SYSTEMS AND METHODS SUPPORTING COMPOSABLE SYSTEM ARCHITECTURES

TECHNICAL FIELD

The present disclosure relates to system architecture design and more specifically, to systems and methods supporting composable system architectures utilizing packaged software capabilities.

BACKGROUND

Presently available techniques for development and deployment of system architectures are complex and can create challenges in identifying and integrating various components required to support the functionality to be provided by the system. As a non-limiting example, suppose an enterprise wants to develop an online or web-enabled system that provides customer facing elements (e.g., an online catalog of parts or services, checkout or payment functionality, interactive chat services for providing customer support, etc.) and internal facing elements (e.g., vendor management services, inventory management services, shipping management functionality, etc.). Using presently available system design and deployment techniques the requirements for each of these elements may be specified and then compared to available solutions for each element. Where requirements for one or more elements cannot be met by available solutions, custom solutions may be designed and developed. Once all elements have been created, including any custom and existing elements of the system, further processes may be performed to enable interoperability between the various-a process known as integration.

As can be appreciated from the above, designing, developing, and deploying a new system architecture is a complex problem that presents several technical challenges. For example, while some or all elements of the system may be available off-the-shelf, such existing system elements may still require further customized development to enable integration of and interoperability between those elements. Such integration adds additional layers of complexity on top of the need to ensure any custom developed or off-the-shelf elements satisfy the system requirements, which increases the costs (e.g., including both monetary costs and computational resource costs) for developing, deploying, and maintaining the system.

SUMMARY

The present disclosure provides systems and methods for development of computing system functionality using packaged software capabilities. A packaged software capability, as used herein, represents a reusable granular unit that may serve as a building block for composing applications and system functionality. Each packaged software capability may represent a discrete package or logical unit of work (e.g., functionality/technology). Packaged software capabilities may provide standardized integration options (e.g., application programming interfaces (APIs), events (e.g., for logging and performance monitoring), or other features. Packaged software capabilities may also expose any required configuration options for contextualization (properties), support self-provisioning or deprovisioning of infrastructure (e.g., via an infrastructure API), and be interoperable across other enterprise systems and beyond. In view of such characteristics, packaged software capabilities may be viewed as discrete units providing functionality to support one or more specific tasks and which may be combined to form larger functionalities.

Using the disclosed systems and methods, a platform supporting cataloging of packaged software capabilities may be created. The platform may additionally provide functionality to support distribution and maintenance of packaged software capabilities. The catalog of packaged software capabilities may be searchable. When searching the catalog, search parameters received from a user's computing device may be used to perform various types of analytics designed to identify best fit packaged software capabilities. The best fit packaged software capabilities may include packaged software capabilities that provide features and/or functionality indicated by the search parameters. For example, a search of the catalog based on the search parameters may include: generating metrics associated with the packaged software capabilities in the catalog based on the search parameters; identifying candidate packaged software capabilities from among the catalog; and eliminating a portion of the candidate packaged software capabilities based at least in part on the metrics to produce a set of search results that includes a remaining portion of the candidate packaged software capabilities. In an aspect, the metrics may correspond to similarity metrics and the candidate packaged software capabilities may be identified and reduced to obtain the set of search results. For example, various characteristics of packaged software capabilities evaluated using the disclosed analytics may be used to determine whether each candidate software capability is satisfactorily similar to the search parameters, thereby producing a set of search results that closely matches the capabilities indicated by the search parameters.

The platform may output the set of search results to a graphical user interface to enable selection of one or more packaged software capabilities for deployment. To illustrate, a user may provide an input corresponding to selection of a packaged software capability included in the set of search results, where the selected identifies a packaged software capability that is to be deployed on a remote system or computing environment (or may be provided via an existing environment where the packaged software capability resides, such as in a cloud environment). In response to selection of the packaged software capability, a smart contract may be invoked and an NFT may be generated. The NFT may represent an authorization to deploy the selected packaged software capability to a computing environment or use the selected packaged software capability. In an aspect, a fee may be charged in exchange for generating the NFT and providing access to the selected packaged software capability. The fee may be shared between an operator of the distribution platform and a developer that created the NFT.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

The invention provides a platform for evaluating and distributing packaged software capabilities, which may also be referred to as packaged business capabilities. The packaged software capabilities described herein may be discrete pieces of software designed to perform a specific task and multiple packaged software capabilities may be combine to create larger functionality, such as an application. Packaged software capabilities may be analyzed using a variety of techniques to evaluate interoperability based on standard(s) to determine whether the packaged software capabilities support desired hardware, authentication, authorization, and the like. A catalog of packaged software capabilities satisfying the standard(s) may be created and the platform may provide a variety of techniques for searching the catalog based on search parameters to identify best fit packaged software capabilities meeting a user's needs. The catalog may be searched using a variety of intelligent analytics designed to enable identification of packaged software capabilities within the catalog that match a set of search parameters. Each of the exemplary features described above, as well as additional features, are described in more detail below. It is noted that while the description herein refers to "software" capabilities, the composable architecture provided by embodiments of the present disclosure may be readily applied to other concepts for which composability in the manner described herein may be applied.

Figure 1:
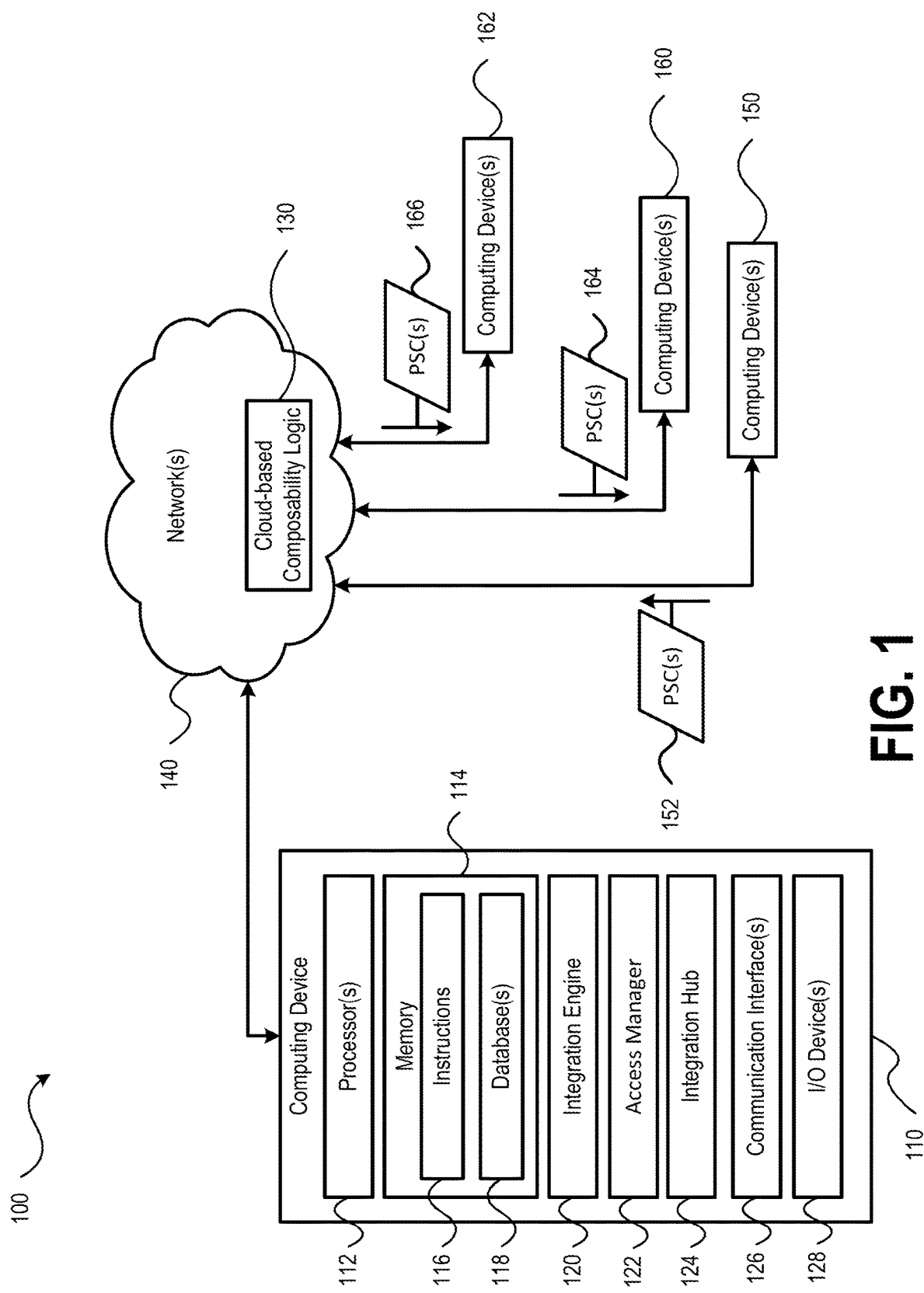
FIG. 1 is a block diagram of an exemplary system for composing a system architecture using packaged software capabilities in accordance with the present disclosure.

Referring to FIG. 1, a block diagram of an exemplary system for composing a system architecture using packaged software capabilities in accordance with the present disclosure is shown as a system 100. The system 100 includes a computing device 110 communicatively coupled to computing device 150, 160, 162 via one or more networks 140. As described in more detail below, the computing device 110 provides functionality to support composing system architectures using packaged software capabilities. For example, computing device(s) 150 may be associated with entities that create packaged software capabilities, shown in FIG. 1 as packaged software capabilities 152. The functionality provided by the computing device 110 may be configured to validate one or more packaged software capabilities 152 received from the computing device(s) 152 and then enable use of the packaged software capabilities 152 to compose new system architectures or portions thereof (e.g., replace one or more existing elements of a system architecture with new elements). Exemplary details regarding the above-described functionality and other operations and features provided by the computing device 110 to support composing system architectures using packaged software capabilities in accordance with the present disclosure are described in more detail blow. It is noted that while primarily described with reference to computing device 110, it should be understood that the features and functionality of the system 100 described herein may be performed in in a variety of implementations, including as a cloud-based system, shown in FIG. 1 as cloud-based composability logic 130. Accordingly, it is to be understood that the exemplary operations described herein may be provided in a traditional client-server type computing architecture or may also be deployed in cloud-based implementations or other configurations.

As shown in FIG. 1, the computing device 110 includes one or more processors 112, a memory 114, an integration engine 120, an access manager 122, an integration hub 124, one or more communication interfaces 126, and one or more input/output (I/O) devices 128. The one or more processors 112 may include one or more microcontrollers, application specific integrated circuits (ASICs), field programmable gate arrays (FPGAs), central processing units (CPUs) having one or more processing cores, or other circuitry and logic configured to facilitate the operations of the computing device 110 in accordance with aspects of the present disclosure.

The memory 114 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. As shown in FIG. 1, operations and functionality of the computing device 110 may be stored as instructions 116 that, when executed by the one or more processors, cause the one or more processors to perform the operations described herein with reference to the computing device 110. Additionally, the memory 114 may store one or more databases 118. As non-limiting examples, the one or more databases may include a requirements database, one or more blockchains, or other types of datastores configured to support the functionality of the computing device 110. Exemplary aspects of a blockchain that may be utilized to support the functionality of the computing device 110 are described in more detail below with reference to FIG. 3.

The integration engine 120 may be configured to provide functionality for validating packaged software capabilities 152 received from the computing device(s) 150. Validating packaged software capabilities may include verifying compliance with one or more standards. The validation of packaged software capabilities compliance with defined standards may be designed to ensure interoperability between different packaged software capabilities maintained by the computing device 110. For example, when the packaged software capabilities 152 are received from the computing device(s) 150, the integration engine 120 may use various processes to analyze the packaged software capabilities 152 to determine the functionality each packaged software capabilities 152 provides, verify requirements specified for packaged software capabilities (e.g., interoperability requirements), and store any received packaged software capabilities 152 satisfying the specified requirements in the one or more databases 118. As described in more detail below, once stored in the database(s) 118, the packaged software capabilities may be searchable and selectable to enable incorporation or integration of the packaged software capabilities stored in the database(s) 118 into an external system, such as systems associated with the computing devices 160, 162.

The access manager 122 may be configured to provide functionality to control access to packaged software capabilities. For example, entities or individuals may register with the computing device 110 using functionality of the access manager 122 and once registered, may submit packaged software capabilities to the computing device 110. The packaged software capabilities stored in the one or more databases 118 may also be used by registered entities and individuals to design and deploy other systems, as described in more detail below.

The integration hub 124 is configured to provide functionality that enables entities to find and retrieve packaged software capabilities. For example, the integration hub 124 may provide an interface that enables entities or individuals to search the packaged software capabilities stored in the one or more databases 118. In an aspect, the integration hub 124 (or another component of the computing device 110) may also maintain one or more data models storing metadata associated with the packaged software capabilities stored in the one or more databases 118, which may be used to support the searching of the packaged software capabilities. Exemplary details and operations of the integration hub 124 are described in more detail below.

The one or more communication interfaces 126 may be configured to communicatively couple the computing device 110 to one or more remote computing devices 150, 160, 162 via one or more networks 140 via wired or wireless communication links established according to one or more communication protocols or standards (e.g., an Ethernet protocol, a transmission control protocol/internet protocol (TCP/IP), an Institute of Electrical and Electronics Engineers (IEEE) 802.11 protocol, an IEEE 802.16 protocol, a 3rd Generation (3G) communication standard, a 4th Generation (4G)/long term evolution (LTE) communication standard, a 5th Generation (5G) communication standard, and the like). The one or more I/O devices 128 may include one or more display devices, a keyboard, a stylus, one or more touchscreens, a mouse, a trackpad, a microphone, a camera, one or more speakers, haptic feedback devices, or other types of devices that enable a user to receive information from or provide information to the computing device 110. In some implementations, the computing device 110 is coupled to the display device, such as a monitor, a display (e.g., a liquid crystal display (LCD) or the like), a touch screen, a projector, a virtual reality (VR) display, an augmented reality (AR) display, an extended reality (XR) display, or the like. In some other implementations, the display device is included in or integrated in the computing device 110.

Each of the computing device 150, 160, 162 may be a server, a personal computing device, a laptop computing device, a virtual machine, network appliance (e.g., router, switch, etc.), or other type of device on which packaged software capabilities may be deployed. The computing device 150, 160, 162 may also include memory, communication interfaces, I/O devices, and the like, which may be the same as or similar to the same elements described above with reference to computing device 110.

Using the above-described functionality of the computing device 110 may enable all or portions of systems and system architectures to be designed and deployed without requiring development of new code. As a non-limiting example, suppose that an entity is seeking to establish an online marketplace and has designed the online marketplace to include the computing device 160 (e.g., a payment server for accepting and processing payments) and the computing device 162 (e.g., a web server to support a web-based interface for the online marketplace). The set of packaged software capabilities 152 provided to the computing device 110 from the computing device 150 (e.g., a packaged software capability developer) may include various packaged software capabilities providing different functionality. To illustrate, a first packaged software capability 166 may provide payment processing functionality for accepting payments over a network; and a second packaged software capability 164 may provide shopping cart management functionality to facilitate selection of items for purchase from an online marketplace. The first packaged software capability 164 may be identified as being suitable for deployment on the computing device 160 (e.g., a payment server) and the second packaged software capability 166 may be identified as being suitable for deployment on the computing device 160 (e.g., a web server). It is noted that while shown in FIG. 1 as being different computing devices, it should be recognized that the packaged software capabilities 164, 166 may be deployed on a single computing device (e.g., the computing device 160 or the computing device 162) or a virtual device.

The packaged software capability 166 may be designed to support passing of information maintained in the shopping cart (or any other form of functionality provided by a packaged software capability) to other packaged software capabilities as output, such as packaged software capability 166. For example, the outputs of the packaged software capability 166 may include information maintained in a shopping cart, such as a payment amount, items being purchased, and other relevant information for payment processing (e.g., customer account information, identity information, etc.). No coding may need to be performed to provide the core functionality of each packaged software capability because the functionality of the packaged software capabilities has been determined (e.g., based on the functionality of the integration engine 120) to satisfy the packaged software capability requirements or standards. Accordingly, the online marketplace may be rapidly deployed and operational after installing the packaged software capabilities 164, 166 and performing interoperability tuning, where the tuning involves configuring function calls or other types of methods for exchanging data between packaged software capabilities.

Figure 2:
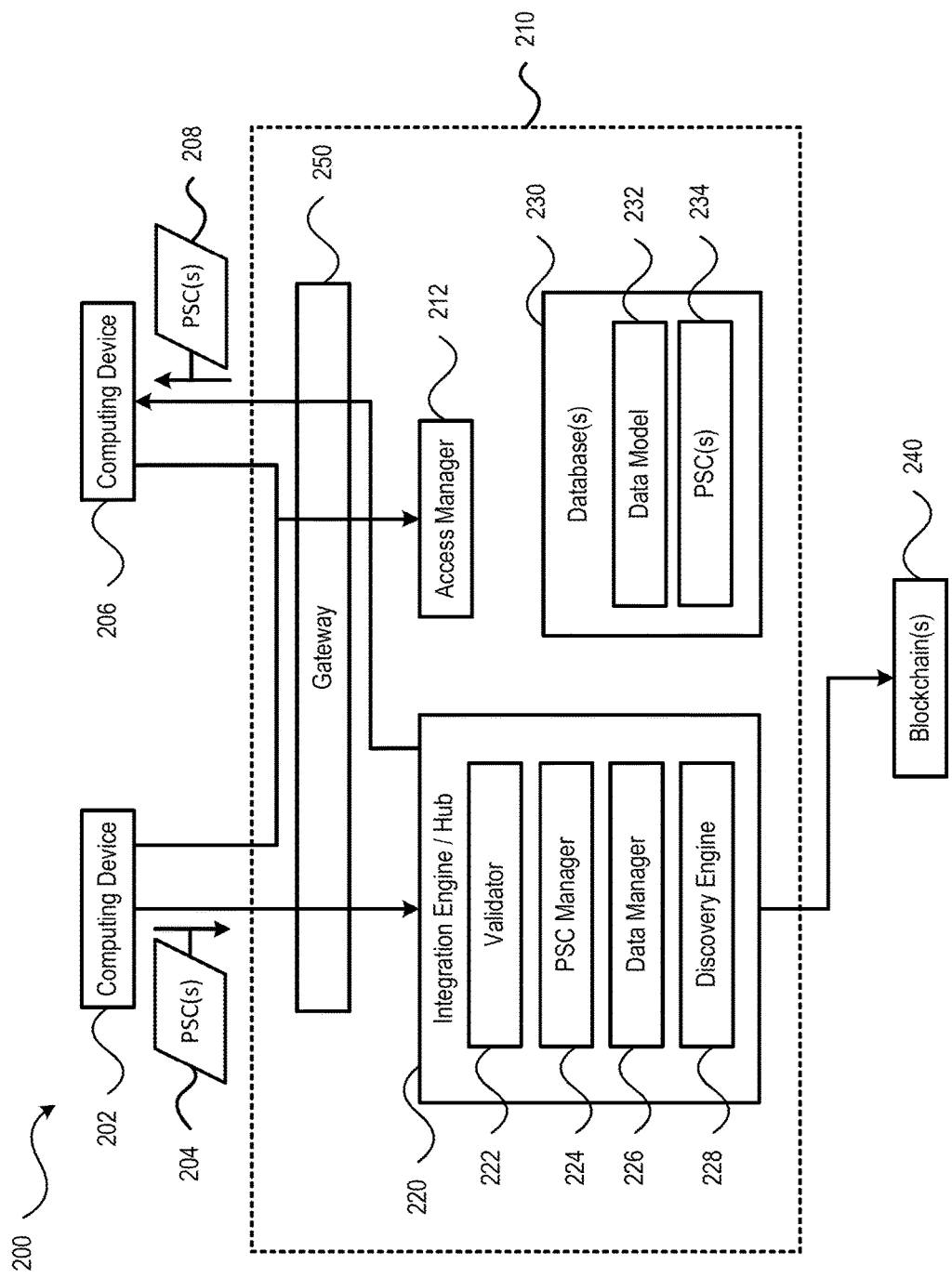
FIG. 2 is a block diagram illustrating exemplary aspects for composing a system architecture using packaged software capabilities in accordance with the present disclosure.

To further illustrate the above-described operations and referring to FIG. 2, a block diagram illustrating exemplary aspects for composing a system architecture using packaged software capabilities in accordance with the present disclosure is shown as a system 200. It is noted that the system 200 may be a specific instance or implementation of the system 100 of FIG. 1. For example, in FIG. 2 the system 200 includes an access manager 212, an integration hub 220, one or more databases 230, a blockchain 240, and a gateway 250. As noted by block 210, the functionality provided by the access manager 212, the integration hub 220, the one or more databases 230, and the gateway 250 may be incorporated into a computing device 210, which may be an implementation of or correspond to the computing device 110 of FIG. 1. It is noted that the operations described with respect to the access manager 212, the integration hub 220, and the one or more databases 230 may be provided by or correspond to the functionality of the access manager 122, the integration hub 124, and the one or more databases 118 of FIG. 1.

As shown in FIG. 2, the computing device 210 may be in communication with computing devices 202, 206, which may correspond to the computing device(s) 150 and one of the computing devices 160, 162 of FIG. 1, respectively. For example, the computing device 202 may be associated with entity that creates packaged software capabilities, shown in FIG. 2 as SPC(s) 204, and the computing device 206 may be associated with an entity that utilizes packaged software capabilities (e.g., packaged software capabilities 208) to configure a system, a service, or other functionality to be provided to users of the computing device 206 (or a larger system that incorporates the computing device 206). Exemplary operations for deploying functionality on the computing device 206 via packaged software capabilities is described below.

As briefly explained above, systems operating in accordance with the present disclosure include an access manager, such as the access manager 212, configured to manage access to the functionality provided by the computing device 210. For example, users associated with the computing devices 202, 206 may communicate with the access manager 212 to register or create an account with the computing device 210. The access manager 212 provides account creation functionality that enables creation of credentials, such as an account identifier (e.g., a username, an e-mail address and/or a numeric or alpha-numeric identifier) and a password. Optionally, the account creation functionality may capture payment information in connection with payment of a service or subscription fee charged in exchange for providing access to the packaged software capabilities hosted by the computing device 210.

Once registered, users associated with the computing devices 202, 206 may login using the account credentials to access functionality provided by the integration hub 220. In an aspect, the access to the integration hub 220 may be access via the gateway 250. As briefly explained above, new packaged software capabilities may be provided to the computing device 210 where they may be stored and distributed to others. For example, one or more packaged software capabilities 204 designed by an entity associated with the computing device 202 may be provided to the computing device 210 (e.g., after successfully authenticating with the access manager 210).

Once provided to the computing device 210, the packaged software capabilities 204 may be provided to a validator 222 of the integration hub 220. In an aspect, the validator 222 may correspond to functionality provided by the integration engine 120 of FIG. 1. For example, validator 222 may be configured to determine whether the packaged software capabilities 202 satisfy one or more applicable specifications designed to support interoperability between packaged software capabilities. As a non-limiting example, the specifications may dictate different types of information that should be capable of being captured and or output by the packaged software capabilities, data types (e.g., integer, float, string, array, etc.) associated with the inputs and/or outputs of the packaged software capabilities, formats for data inputs and/or outputs of the packaged software capabilities, or other types of guidelines designed to support interoperability between different packaged software capabilities. In an aspect, the specifications or guidelines may be designed according to an industry to which each packaged software package capability directed. For example, a specification may be designed for packaged software capabilities supporting e-commerce applications and tools (e.g., online product catalogs, c-commerce shopping cart and payment processing applications, etc.), medical and/or research applications and tools (e.g., medical records management applications, diagnostic software, lab applications, etc.), or other types of applications and tools for various industries. Exemplary aspects for validating compliance of packaged software capabilities with applicable requirements are described in more detail below.

Packaged software capabilities determined to comply with applicable specification requirements may be stored in the one or more databases 230, such as in a packaged software capabilities database 234. In addition to maintaining a database of developed packaged software capabilities that have been validated as complying with the relevant specifications and guidelines, the computing device 210 may also maintain additional databases, such as a data model 232. The data model 232 may be configured to maintain metadata associated with verified packaged software capabilities and may be used to support search functionality for locating packaged software capabilities stored in the packaged software capabilities database 234. The data model 232 may be generated by a data manager 226, which may be configured to extract metadata from the packaged software capabilities 204 provided to the computing device 210 (e.g., following validation by the validator 222). Exemplary aspects for generating the data model 232 and using it to locate relevant packaged software capabilities are described in more detail below with reference to FIG. 4. As additionally shown in FIG. 2, the integration hub 220 may also include a discovery engine 228. The discovery engine 228 may be configured to search the data model 232 to identify packaged software capabilities within the packaged software capabilities database 234 based on information provided by a user.

The blockchain 240 may be utilized to store information associated with deployed packaged software capabilities.

For example, the blockchain 240 may include smart contracts configured to issue credentials that may be used to manage access to packaged software capabilities. In an aspect, the credentials issued by the smart contracts may be non-fungible tokens (NFTs), which may be generated according to ERC-721 or another NFT standard. The computing device 210 includes a packaged software capabilities manager 224 configured to interact with the blockchain 240. For example, the packaged software capabilities manager 224 may be configured to manage interaction with various smart contracts of the blockchain 240 in connection with deployment of packaged software capabilities to the computing device 206 or other computing devices. Additional exemplary aspects of the operations and functionality provided by packaged software capabilities manager 224 and the blockchain 240 are described in more detail below.

To illustrate the exemplary operations and functionality described above, suppose that a user of the computing device 206 desires to deploy packaged software capabilities maintained in the packaged software capabilities database 234 on the computing device 206 (or a system associated with the computing device 206), such as to deploy new functionality on the computing device 206 or replace existing functionality associated with the computing device 206. After authenticating with the access manager 212, the user may provide inputs to the user interface to indicate packaged software capabilities functionality of interest (i.e., information indicating what capabilities are desired to be deployed on the computing device 206). The graphical user interface may provide interactive elements (e.g., check boxes, radio buttons, dropdown menus, data fields, and the like) designed to capture information associated with the functionality of interest to the user. In an aspect, the inputs may be captured in a directed workflow in which information associated with an industry is captured first and then the interface is updated to display interactive elements corresponding to various types of functionalities relevant to the identified industry.

Once the inputs are captured, the access manager 212 identify packaged software capabilities within the database 234 by searching the data model 232. For example, the inputs may be provided to the discovery engine 228. The discovery engine 228 analyzes the inputs and extracts information from within the inputs associated with the packaged software capabilities of interest. As explained above, the graphical user interface in which the inputs may be received may provide specific fields or interactive elements for specifying the features of interest. Where check boxes and similar interactive elements are provided, each interactive element may be associated with a different feature or set of features, and selection of an interactive element may indicate an interest in the feature corresponding to the selected element (s). Exemplary features may include specific functionalities, such as electronic payment processing, data encryption, database management features, and the like. It is noted that the user interface elements designed to capture features and functionality of interest for packaged software capabilities may be specified at a general or granular level or on a more micro level. For example, features and functionality may be specified as categories and sub-categories (e.g., industry/sub-industry, such as e-commerce/payment processing or e-commerce/webstore) or may be specified using very specific criteria (e.g., criteria that specify the hardware platform, operating system compatibility, interoperability requirements with respect to other packaged software capabilities or software platforms, cloud service provider support, etc.). Additionally, or alternatively, features of packaged software capabilities of interest may be identified within the inputs provided to the graphical user interface via other types of interactive elements and methods, such as via text-based inputs (e.g., entries within data fields, software requirements specifications, or other methods).

Figure 4:
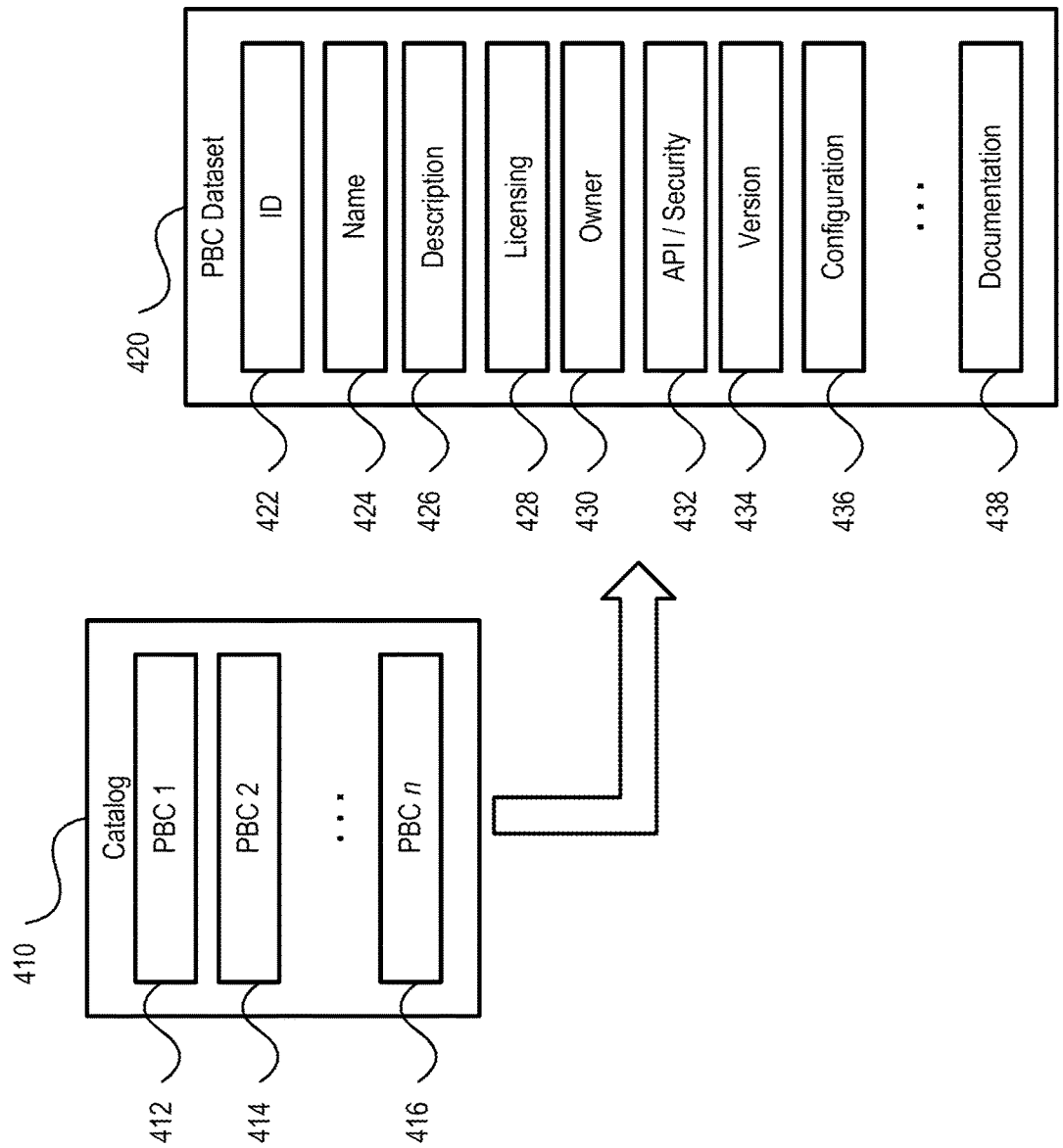
FIG. 4 is a block diagram illustrating exemplary aspects for composing a system architecture using packaged software capabilities in accordance with the present disclosure.

To identify packaged software capabilities of interest based on the inputs, the discovery engine 228 may compare the features of interest extracted from the inputs to metadata included in the data model 232, where the data model 232 information corresponding to each of the packaged software capabilities stored in the packaged software capabilities database 234. As an illustrative example and referring to FIG. 4, a block diagram illustrating exemplary information that may be stored in a data model in accordance with aspects of the present disclosure is shown. In particular, FIG. 4 shows a catalog of packaged software capabilities 410 representing various packaged software capabilities 412, 414, 416 that have been created. For example, the packaged software capabilities 412, 414, 416 may include n packaged software capabilities, which may be stored in a database (e.g., one of the one or more databases 118 of FIG. 1 and/or the packaged software capabilities database 234 of FIG. 2). Information associated with each packaged software capability may be used to create records with a data model (e.g., the data model 232 of FIG. 2) to enable packaged software capabilities of interest to be identified in an efficient manner. As a non-limiting example, the data model may enable packaged software capabilities to be searched by industry so that packaged software capabilities presented in response to information provided by a user may be relevant to the needs of the user.

As shown in FIG. 4, the data model may include records 420 that include metadata about each packaged software capability. Each record 420 may include a unique identifier 422, name information 424, description information 426, licensing information 428, ownership information 430, application programming interface (API) and security information 432, version information 434, configuration information 436, and documentation information 438. The unique identifier 422 may be an identifier unique within a packaged software capabilities distribution system (e.g., the system 100 of FIG. 1) and may include a string of numeric characters (e.g., 11003684), letters (e.g., PSC_A), or alphanumeric characters (e.g., PSC_1). The name information 424 may correspond to the name assigned to the packaged software capability by the developer (e.g., electronic payments processing) or assigned for purposes of listing and searching in a catalog of packaged software capabilities. The description information 426 may include a detailed description of the packaged software capabilities, its purpose (i.e., what the packaged software capability is to be used for), and capabilities (e.g., what functionalities the packaged software capability provides). The licensing information 428 may specify usage rights or a type of license associated with the software (e.g., open source or public domain, proprietary, perpetual, subscription, etc.). The ownership information 430 may provide information about the developer or entity with authority to distribute the packaged software capability (e.g., the entity name, address, contact information, and the like), legal information (e.g., liability information, disclaimers, terms of use or service, etc.), or other types of information. The API and security information 432 may provide information related to APIs available within the packaged software capability (e.g., uniform resource locators (URLs) and function calls for the API and their respective inputs and outputs), while the security information may specify information related to security features of the packaged software capability (e.g., encryption configuration, authentication techniques, or other security settings). The version information 434 may specify a version of the packaged software capability (e.g., different versions of a packaged software capability may be associated with different records 420). The configuration information 436 may provide information on the configuration of the environment in which the packaged software capability is to be deployed, such as information regarding compatibility with different cloud-service providers (e.g., Amazon Web Services, Microsoft Azure, etc.), hardware compatibility, or other hardware and/or environment configuration requirements. The documentation information 438 may include information providing a detailed overview of the packaged software capability (e.g., provide detailed information on configuration of the packaged software capability for different environments, configuring API calls from external sources, configuring security settings, and the like). It is noted that the exemplary types of information included in the record 420 shown in FIG. 4 have been provided for purposes of illustration, rather than by way of limitation and that records associated with data models utilized in accordance with the present disclosure may include more types of information or less types of information than those explicitly described herein. As additional non-limiting examples, the data model 232 may also capture information associated with a log-sink, which may be specification of a logging framework for logging events of a packaged software capability, or information associated with a handle for a transaction management system operable to facilitate transactions.

Maintaining the data model (e.g., the data model 232 of FIG. 2) containing records 420 for each packaged software capability available for deployment may enable packaged software capabilities of interest to be identified more quickly and efficiently as compared to merely displaying all packaged software capabilities on a user interface and allowing the user to browse them. It is noted that the various types of information captured by the data model 232 may be used to create a template for packaged software capabilities (i.e., a template that identifies the types of information that should be provided when submitting packaged software capabilities for publications/distribution). For example, and referring back to FIG. 2, when the inputs are received from the user (e.g., a user of the computing device 206) regarding the features and functionality of interest, the discovery engine 228 may evaluate the inputs against the data model 232 to identify the packaged software capabilities of interest (i.e., the packaged software capabilities satisfying the criteria specified by the inputs provided by the user). In an aspect, the discovery engine 228 may utilize machine learning techniques to intelligently locate packaged software capabilities, as described in more detail below with reference to FIG. 6.

The packaged software capabilities identified by the discovery engine 228 may be output to the user of the computing device 206 via the graphical user interface. The user may review the discovered packaged software capabilities to identify one or more packaged software capabilities for deployment (e.g., on the computing device 206 or a system associated with the computing device 206). Once identified, the user may provide information in connection with obtaining access to the packaged software capabilities. For example, the packaged software capabilities manager 224 may be configured to manage access to the packaged storage capabilities. When the user selects one or more packaged software capabilities for acquisition, the packaged software capabilities manager 224 may initiate operations to deploy the packaged software capabilities to the computing device 206 or related system.

For example, the packaged software capabilities manager 224 may be configured to invoke functionality of one or more smart contracts maintained on the blockchain 240. The invoked smart contract functionality may be configured to generate an NFT(s) that indicates authorization to utilize the selected one or more packaged software capabilities, shown in FIG. 2 as the packaged software capabilities 208. The NFT may be recorded to a block of the blockchain 240 to provide an immutable record of the authorization of access. In an aspect, each packaged software capability may be associated with a smart contract that generates NFTs providing proof of authorization for the corresponding packaged software capability. In an additional, or alternative aspect, some smart contracts of the blockchain 240 may be configured to generate NFTs evidencing authorization to access multiple packaged software capabilities (e.g., a smart contract may be configured to generate a single NFT evidencing authorization to access two or more packaged software capabilities or a smart contract may be configured to generate multiple NFTs, each evidencing authorization to access two or more different packaged software capabilities, or other smart contract configurations).

Figure 3:
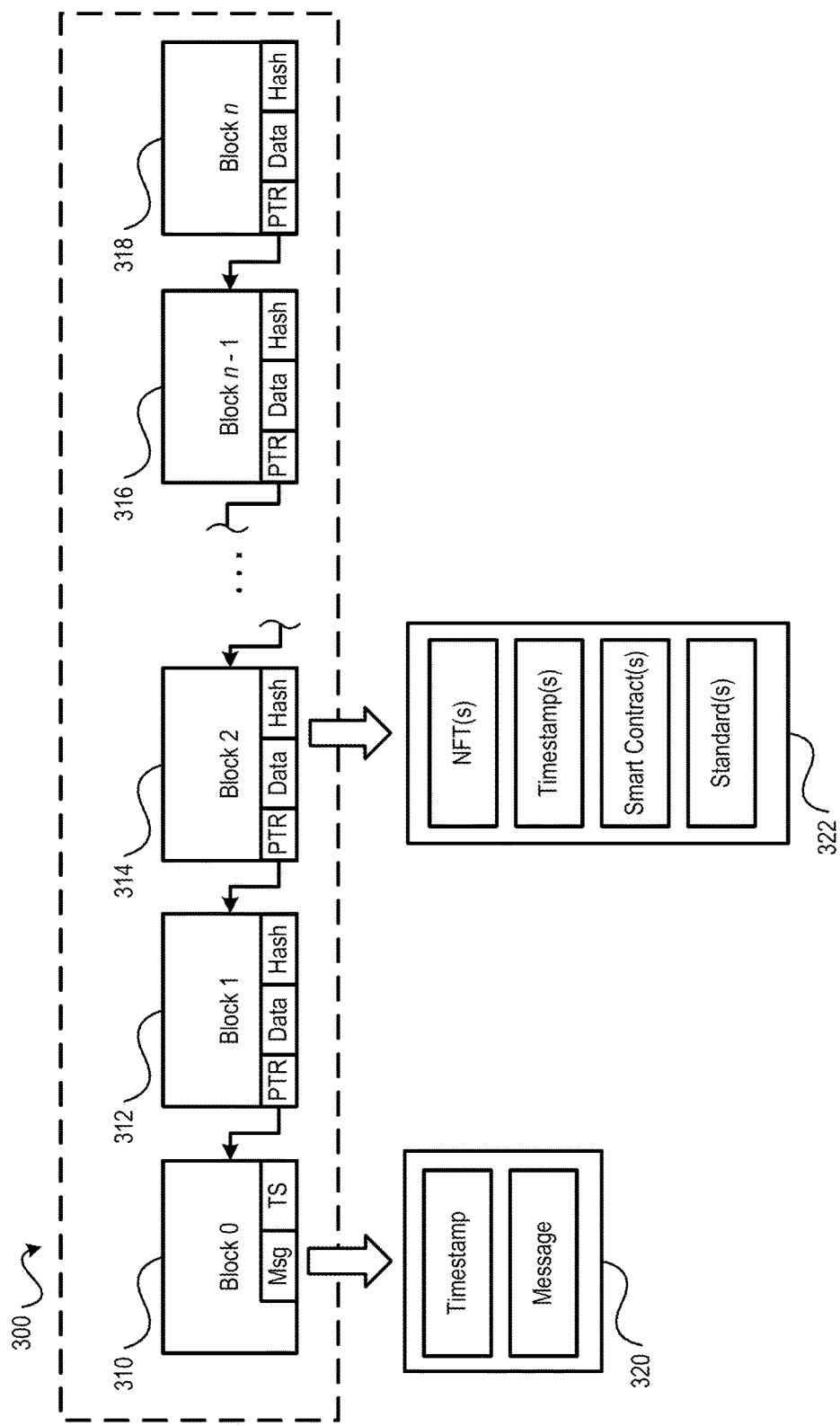
FIG. 3 is a block diagram illustrating exemplary aspects of a blockchain utilized in connection with composing a system architecture using packaged software capabilities in accordance with the present disclosure.

An illustrative and non-limiting example of the blockchain 240 is shown in FIG. 3, which shows a blockchain 300. The blockchain 300 of FIG. 3 includes a genesis block 310 and additional blocks 312-318. Each block may include a data portion and a hash value. The data portion may contain data recorded to the block, which may include a timestamp, user information (e.g., information associated with the user of the computing device 206 of FIG. 2), one or more packaged software capabilities involved in a transaction, smart contracts, or various other types of information depending on the particular configuration of the blockchain 240 and the types of auditing that may be supported or desired in view of the immutability of the blocks.

As shown at record 320, the genesis block 310 may include a timestamp noting the time and date the genesis block 310 was created. The genesis block 310 may also include additional information, such as a message or other information at the discretion of the creator of the blockchain 300. Each block other than the genesis block may include a data portion, a pointer (PTR), and a hash value. The pointer of each block points to a previous block (e.g., block n points to block n–1, and so on until the genesis block is reached), thereby linking the blocks of the blockchain 300 to each other in order of their creation. The data portion of each block may be used to record various types of information, such as timestamps, smart contracts, NFTs, packaged software capabilities specifications or requirements (e.g., used for validating packaged software capabilities via the integration engine 120 of FIG. 1 or the validator 222 of FIG. 2), or other types of information. Additional examples of the information that may be recorded to the blocks of the blockchain 300 may include all or portions of the information described in connection with the data record(s) 420 of FIG. 4 or other types of information related to packaged software capabilities. The hash value may correspond to a hash of the previous block and may be used to validate the authenticity of the prior block. For example, because blocks may not be changed once created, the hash value of a later generated block should always match the hash of the previous block and any discrepancy may be used to detect malicious activity.

As can be appreciated from the foregoing, the pointer information in each block may be traversed and the data and/or hash value of one or more blocks analyzed to facilitate auditing of the information maintained in the data portions of the blocks. It is noted that the specific number of blocks shown in FIG. 3 and the exemplary types of data stored in the blocks have been provided for purposes of illustration, rather than by way of limitation and that blockchains utilized in accordance with the present disclosure may include any number of blocks and record more, fewer, or different types of information relative to the non-limiting examples described herein.

As briefly explained above, smart contracts of the blockchain 300 may support and provide various types of functionality for distributing and utilizing packaged software capabilities in accordance with the present disclosure. For example, smart contracts may be used to provide payment services with respect to providing payment to a developer for any packaged software capabilities distributed to users. When payment is completed, the smart contract (or another smart contract) may invoke functionality to generate an NFT representing a license to use the packaged software capabilities. For example, rather than entering an alpha-numeric license code or software key, the NFT may serve as a credential authorizing use of the packaged software capabilities. The smart contracts may also provide functionality to revoke credentials associated with issued NFTs, such as is a subscription to a packaged software capability is not renewed. Smart contracts may also provide other types of functionality outside of payments and generation/revocation of NFTs. For example, a smart contract may be configured initiate, validate, or simply record the results of the validation process for verifying packaged software capabilities satisfy design specifications and requirements enforced by the distribution platform (e.g., to maintain interoperability, security, and consistency). As another example, smart contracts may be utilized to monitor for versioning changes in deployed packaged software capabilities and may facilitate generation of notifications that newer versions of deployed packaged software capabilities are available or initiate automatic updates of the deployed packaged software capabilities.

Continuing with the example in FIG. 2, once the user has selected one or more packaged software capabilities for deployment on the computing device 206 (or related system), the user may provide payment, or merely registration (e.g., for public domain/open source packaged software capabilities), and access to the one or more packaged capabilities has been authorized (e.g., the NFT(s) have been generated), the user may be enabled to download the packaged software capabilities 208 and install them on the target system. As can be appreciated from the description of FIGS. 2-5 above, systems operating in accordance with the present disclosure provide a secure platform for developing, distributing, and maintaining packaged software capabilities. Additionally, by ensuring that any available packaged software capabilities provided to the system satisfy design requirements, systems may be designed by deploying collections of packed software capabilities in an a-la-cart manner without the need to create software from scratch. As noted above, because packaged software capabilities are verified to satisfy design specifications and are searchable based on specific requirements or needs, complex functionality may be designed using best-of-class packaged software capabilities across a variety of developers, thereby preventing entities from being tied to a particular software vendor or having to do significant integration to enable interoperability between software from different vendors.

Figure 6:
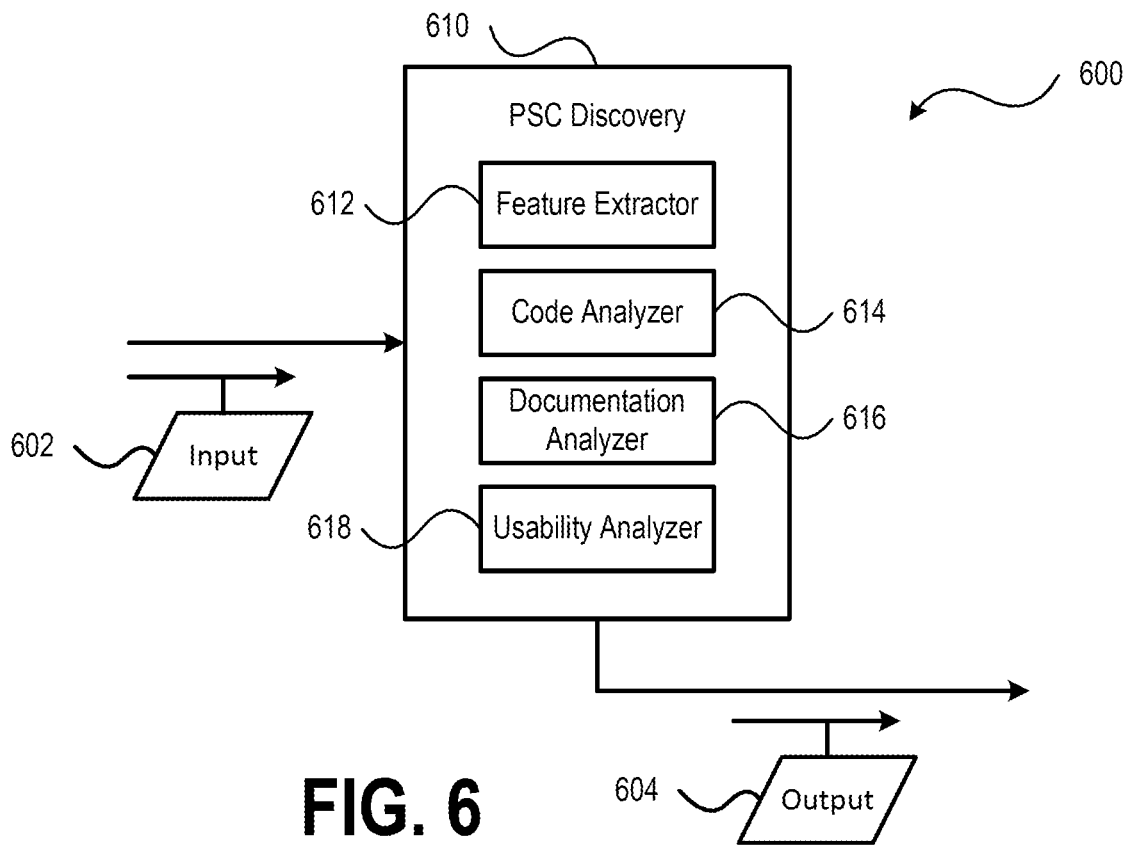
FIG. 6 is another block diagram illustrating additional exemplary aspects for composing a system architecture using packaged software capabilities in accordance with the present disclosure.

Referring to FIG. 6, a block diagram illustrating additional exemplary aspects for composing a system architecture using packaged software capabilities in accordance with the present disclosure is shown. In particular, FIG. 6 shows operations performed to discover features of packaged software capabilities, which enables packaged capabilities (e.g., the packaged capabilities database 234 of FIG. 2) to be searched. For example, the operations described below with respect to the process 600 may be performed by the discovery engine 228 of FIG. 2 or the computing device 110 of FIG. 1 to identify available packaged software capabilities matching search criteria provided by a user. As shown in FIG. 6, a discovery engine 610 (e.g., the discovery engine 228 of FIG. 2) may include a feature extractor 612, a code analyzer 614, a documentation analyzer process 616, and a usability analyzer 618, each of which is described in more detail below.

The feature extractor 612 may be configured to extract data from information associated with a packaged software capability provided to a packaged capability distribution platform (e.g., the system 100 of FIG. 1). As a non-limiting example, the information associated with packaged software capabilities that may be analyzed may include extensible markup language (.xml) files, binary files, or other types of files included in the input 602. The extracted data may include the functionalities, web service definitions, or other types of information. In an aspect, features may be extracted from the binary file using the "string" command in Linux, where the extracted strings may correspond to names of functions within the binary file. Other natural language processing techniques may be used to extract similar features from the .xml file and/other sources of information.

The code analyzer 614 may be configured to determine a degree of similarity between the code of a packaged software capability and one or more known code segments. For example, the code analyzer 614 may utilize a neural network to analyze the source code of a packaged software capability included in the input 602. In an aspect, the neural network may be an In Code-Description Embedding Neural Network (CODEnn) configured to jointly embed code snippets and natural language descriptions of the code snippets into a high high-dimensional vector space. The neural network may include 3 modules: a code embedding network (CoNN) to embed source code into vectors; a description embedding network (DeNN) to embed natural language descriptions into vectors; and a similarity module that measures the degree of similarity between the vectors associated with the source code and natural language descriptions. It is noted that the code snippets and natural language data corresponding the code snippets (e.g., a description of the functionality provided by a code snippet) may have similar vectors. Accordingly, the unified vector representation provided by the CODEnn may enable a natural language query (e.g., a query including search parameters received from a user) to be matched to code snippets according to the vector representations of the code snippets and the natural language query.

For example, the query may be converted to a vector representation using the DeNN and the similarity module may measure the similarity between the vector representation of the query and one or more vectors associated with code snippets of one or more packaged software capabilities. The similarity module may output information indicating a degree of similarity, such as a 1 if the two vectors are similar (e.g., within a threshold degree of similarity) and a 0 if the two vectors are not similar (e.g., not within a threshold degree of similarity). It is noted that using the CODEnn may be more efficient than merely matching text similarity in order to handle noisy or irrelevant keywords that may be provided during a search. The CODEnn may be trained on a set of pre-determined functions and descriptions of the functions, such as a set of functions and descriptions from the Python codebase, which may be a common codebase used to develop packaged software capabilities. When a user submits a query to identify packaged software capabilities of interest, a vector representation of the query may be computed using the DeNN module to obtain a query vector, which may then be used to identify the code snippets whose vector representations are similar to the vector representation of the query. In an aspect, similarity between the query vector and the vectors representing code snippets may be determined using cosine similarity. However, it is noted that other similarity measurement techniques may be used if desired. It is noted that the vector representations of the code snippets may be pre-generated and stored in a database (e.g., one of the one or more databases 118 of FIG. 1 or the packaged software capabilities database 234 of FIG. 2) to improve the speed at which searches may be completed and results returned to the user (e.g., because the code snippets do not have to be processed to obtain their vector representations after each query). In such an implementation, the records associated with the vector representations of the code snippets may include information associating the vector representations to a particular packaged software capability (e.g., using the unique ID of each packaged software capability).

The documentation analyzer process 616 may be configured to determine a similarity between documentation associated with packaged software capabilities and a set of parameters, such as search parameters received from a user searching for packaged software capabilities. For example, the documentation analyzer 616 may be configured to analyze information associated with documentation corresponding to a packaged software capability that indicates an environment the packaged software capability is designed to operate on, system configuration information for the packaged software capability, any additional software needed to support the packaged software capability, a time and space complexity of the packaged software capability, functionality of the packaged software capability, data inputs, and expected outputs, and compare the analyzed information to search criteria of the user.

Figure 5:
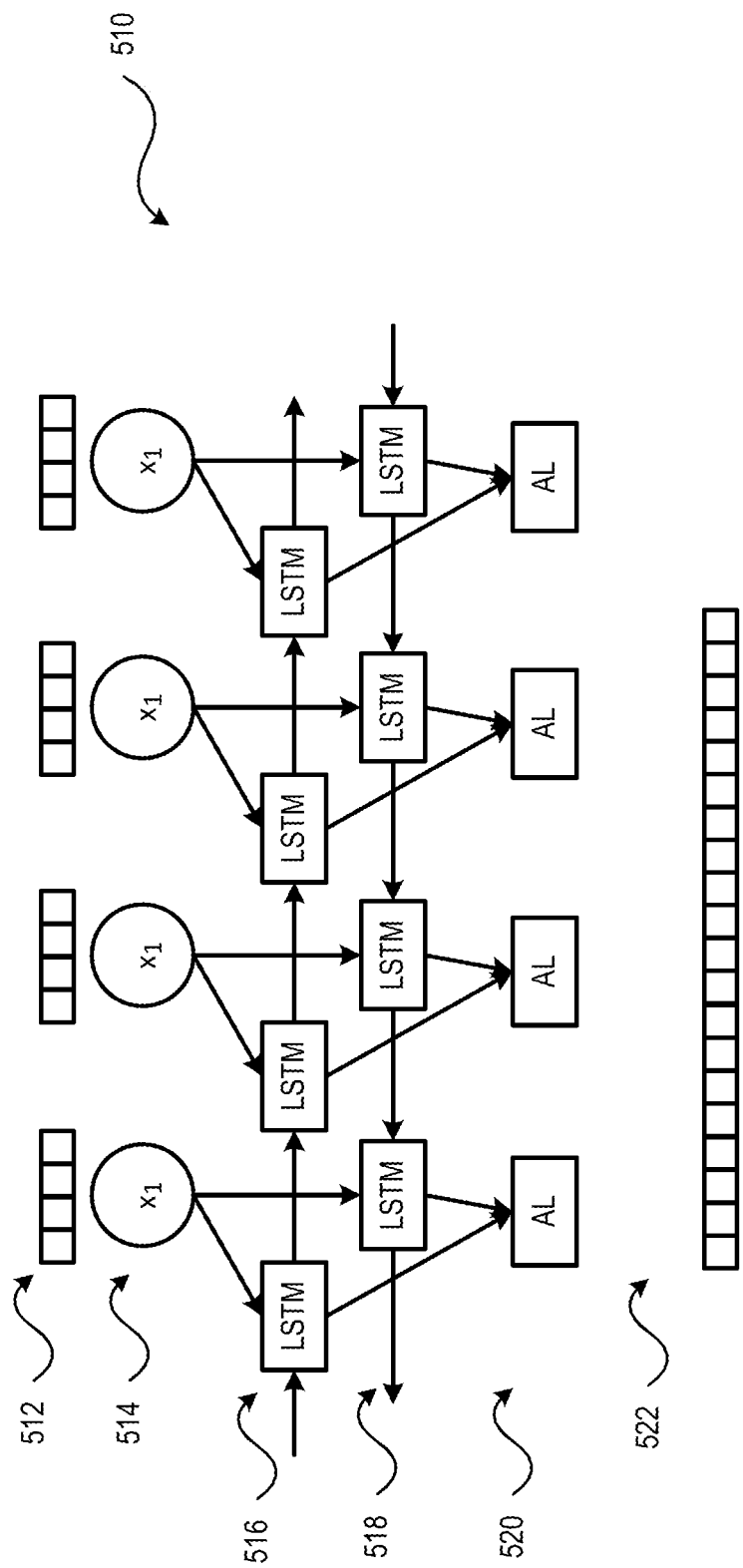
FIG. 5 is a block diagram illustrating additional exemplary aspects for composing a system architecture using packaged software capabilities in accordance with the present disclosure.

A non-limiting example, and referring to FIG. 5, a block diagram of a technique for analyzing packaged software capabilities in accordance with the present disclosure is shown. It is noted that the concepts described with reference to FIG. 5 may be performed by a packaged software capability discovery engine, such as the discovery engine 228 of FIG. 2, and may be performed by the document analyzer 616 of FIG. 6. In FIG. 5 a bi-directional long short-term memory (BILSTM) 510 is shown. The BILSTM 510 may be used to evaluate packaged software capabilities as part of a search process to discover packaged software capabilities relevant to search parameters provided by a user.

In FIG. 5, the BILSTM 510 is shown to include an input layer 512, an embedding layer 514, a forward LSTM layer 516, a backward LSTM layer 518, and an activation layer 520. The bi-directional LSTM may be configured to extract contextually relevant information from a set of inputs (e.g., parameters of a search input by a user) that may be used to locate packaged software capabilities of interest. The input to the BiLSTM may include inputs provided by the user (e.g., search parameters) and packaged software capabilities documentation. Such inputs may be processed using natural language techniques to generate an input dataset that may be provided to the input layer 512. As a non-limiting example, the inputs may be processed to generate tokenized data (e.g., using natural language processing, tokenization, and/or other techniques), vectorized data, or other processing techniques. The input dataset may be provided as input to the embeddings layer 514, which generates a set of embeddings. The embeddings may be processed using the forward LSTM layer 516 and the backward LSTM layer 518. The outputs of the forward and backward LSTM layers 516, 518 may be provided to the activation layer 520, which may be configured to generate outputs based on the activations resulting from the processing by the forward and backward LSTM layers 516, 518. The outputs of the activation layer may correspond to features (e.g., of the packaged software capabilities of interest identified based on the documentation) determined to be relevant to the search parameters received from the user. The results of each node of the activation layer 520 may be concatenated to produce an output vector 522.

Figure 8:
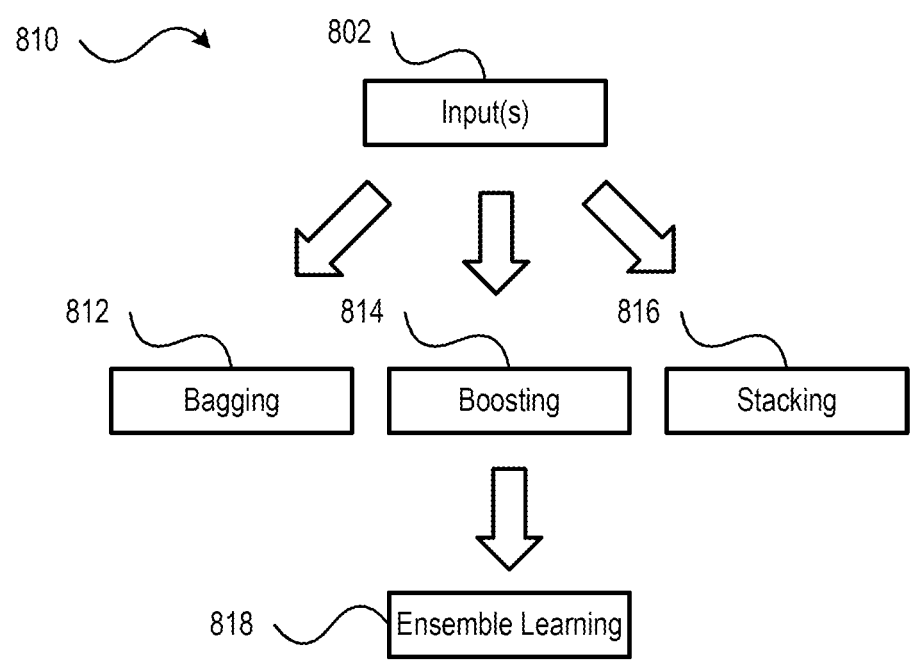
FIG. 8 is another block diagram illustrating additional exemplary aspects for composing a system architecture using packaged software capabilities in accordance with the present disclosure.

The output vector 522 may be evaluated using ensemble modelling techniques to identify the identify the packaged software capabilities of interest that should be returned to the user in response to the search parameters. For example, and referring to FIG. 8, a block diagram illustrating an exemplary framework for identifying packaged software capabilities in accordance with the present disclosure is shown as an ensemble modelling process 810. As shown in FIG. 8, an input 802 may be provided to a variety of algorithms, shown as including a bagging algorithm 812, a boosting algorithm 814, and a stacking algorithm 816. These algorithms may be configured to apply various types of processing to the input 802 to obtain data that may be used to identify the packaged software capabilities of interest.

The ensemble learning process shown in FIG. 8 provides a meta-approach that combines the predictions of multiple models (e.g., boosting, bagging, and stacking models) to improve overall prediction accuracy and generalization with respect to predicted product characteristics and product functions, which may enable identification of one or more existing packaged software capabilities that match the features and functionality of interest to a user (e.g., an IT professional or other individual) seeking to deploy new functionality to a system, device or other technology platform, such as a cloud-based platform. To illustrate, product names and corresponding executable files (e.g., binary files, compiled source code, etc.) may be retrieved from an enterprise catalog (e.g., one of the one or more databases 118 of FIG. 1 storing information associated with available packaged software capabilities). This information may be parsed to extract information associated with the functions and modules of the available packaged software capabilities.

The bagging algorithm 812 may be a trained random forest model that uses decision trees as base models and aggregates the predictions output by the decision trees to make a final prediction or decision. The decision trees may each be trained on different subsets of data to predict the attributes, functions and modules of the packaged software capabilities. As different subsets of data are used for each decision tree independently, the resulting trained decision tree models will each be different, potentially resulting in variance in the predictions of each based model. The random forest model may be trained to combine predictions from the multiple decision tree models to produce the final output or prediction, which may decrease the impact of the variance between the different base trees. For example, the predictions may be combined based on an average of the base decision tree outputs, a majority vote of the predictions of the base decision tree outputs, or another technique. The sequentially generated base learners provide insight into where data dependencies reside. For example, data in the base learner(s) may have some dependency on previous data. During training, insights into the dependencies may be used to tune weights applied during aggregation (e.g., by the random forest model) to get a desired level of performance and improve the overall accuracy of the resulting prediction (s).

The boosting algorithm 814 provides an ensemble technique that can be used to predict the functions and characteristics of a packaged software capability based on its features or attributes. Unlike the bagging algorithm 812, where different base models are trained individually, the boosting algorithm 814 focuses on improving performance by sequentially training based models, with each new model attempting to correct the errors of the previous ones. For example, training may be used to assign higher weights to misclassified instances, allowing subsequent models to focus on those instances and make more accurate predictions. Exemplary boosting algorithms may include Ada-Boost (Adaptive Boosting), Gradient Boosting, and the like.

The stacking algorithm 816 may be configured to generate based models in parallel and as a result, data dependency is not there (e.g., data in the base learner is generated independently). For example, stacking involves training multiple models (often of different types or with different configurations) and then using another model, called a meta-learner, to combine their predictions. The meta-learner learns how to best weigh the predictions of the base models to make a final prediction, such as predictions related to characteristics and functions of packaged software capabilities. Stacking may be used to combine the outputs of various models, such as decision trees, support vector machines, neural networks, and more. The meta-learner can then learn how to optimally use the outputs of these models to provide accurate predictions.

The outputs of the above-described algorithms may then be utilized to perform ensemble learning 818. The ensemble learning 818 may be configured to determine the packaged software capabilities that should be returned to the user in response to the search parameters. It is noted that using ensemble learning 818 based on the outputs of the bagging algorithm 812, the boosting algorithm 814, and the stacking algorithm 816 may result in more accurate predictions of the products and functions of packaged software capabilities, which may enable more accurate identification of packaged software capabilities applicable to the search parameters provided by the user. For example, by using the outputs of the various algorithms described above the ensemble learning may achieve higher accuracy and performance as compared to only using one technique individually, thereby providing better search results (i.e., search results more likely to be directed to the features represented by the search parameters) that identify packaged software capabilities to the user. In an aspect, information associated with the characteristics, functions, or other features of packaged software capabilities may be determined using the above-described techniques on a periodic basis (e.g., daily, weekly, as new packaged software capabilities are received, or some other frequency) and the predicted features and functions may be stored in a database. When the input 802 is received, the packaged software capabilities corresponding to the input 802 may be identified based on the stored information, rather than performing the predictions, which may reduce computational resources required to perform searches in accordance with the present disclosure.

Returning to FIG. 6, the usability analyzer 618 may be configured to evaluate the usability of packaged software capabilities. As used herein, the "usability" of a packaged software capability refers to "the ease with which a user can learn to operate, prepare inputs for, and interpret outputs" of a given packaged software capability. The usability analyzer 618 is configured to evaluate a given packaged software capability's usability based on opinions or reviews of the packaged software capability or other types of information. The usability analyzer 618 may be configured to apply machine learning techniques to evaluate the usability of a packaged software capability based on interface features of the packaged software capability, contextual information (e.g., information associated with user, product, activity, and environment contexts), and usability measures.

The functionality provided by the usability analyzer 618 may be divided into three tasks or phases: 1) Data preparation, 2) Modelling, and 3) Usability Evaluation. Natural language processing may be utilized during data preparation to convert an input dataset (e.g., a dataset containing product reviews or other types of information) to a form suitable for analysis during the modelling phase. The modelling phase may be configured to leverage a variety of techniques to evaluate the usability of the packaged software capability across a variety of usability factors, such as effectiveness, efficiency, and satisfaction. For example, the techniques applied during the modelling phase may include language-based analysis techniques (e.g., bag of words, lexicon-based sentiment analysis, and the like), maximum entropy, and clustering algorithms (e.g., k-nearest neighbors (kNN) or another clustering technique), or other techniques.

As a non-limiting example, feature fatigue analysis (FFA) may be used to evaluate whether a packaged software capability is likely to experience feature fatigue (e.g., a phenomenon in which a user selects a product based on the product's features but then becomes overwhelmed by the complexity of learning to use the features). In an aspect, FFA analysis may be performed using a Bayesian Network trained based on behavioral decision-making theory. Factors impacting whether a customer is satisfied or dissatisfied with a packaged software capability may be evaluated using text-mining techniques. Natural language processing and association rule mining may be used for product usability evaluation to determine customer satisfaction based on reviews of a packaged software capability. A classification model may be provided to objectively classify reviews. For example, the classification model may be a decision tree or a Naïve Bayes trained to classify reviews as being positive reviews (NP) or negative reviews (NN). The usability (U) of a product may be calculated according to:

$$U = \alpha * NN - NP, \qquad \text{(Equation 1)}$$

where α=importance level (e.g., constant value).

In an aspect, the classification model may receive inputs from the other techniques described above. For example, an evaluation matrix incorporating information associated with effectiveness, efficiency, and satisfaction of a packaged software capability may be generated based on the above-described outputs (e.g., of the FFA analysis, the customer satisfaction evaluation, and the like), and the classification model may be configured to perform classification based on the evaluation matrix. It is noted that the classification model may be trained based on a training dataset and during the training the performance of the classification model may be evaluated using accuracy, precision and recalls evaluation indexes until a satisfactory level of performance is achieved. In an aspect, the results of the usability analysis may be stored and presented to a user via a graphical user interface in association with a search for packaged software capabilities. For example, a user may search for packaged software capabilities and the results of the search may be returned to the user and presented in a graphical user interface. When a user selects one of the search results, the metrics derived by the usability analysis described above may be presented to the user.

Using the analysis above, the discovery engine 610 may be configured to identify a set of outputs 604 that may be returned to the user. For example, the set of outputs 604 may identify the packaged software capabilities that satisfy the search parameters provided by a user. More particularly, the set of outputs 604 may identify a set of best fit packaged software capabilities, where the best fit is determined based on the search parameters provided by the user. Having provided a detailed view of the operations that may be performed by the discovery engine 610, an exemplary description of how the various functionalities of the discovery engine 610 may be used to identify best fit packaged software capabilities will now be described.

Figure 7:
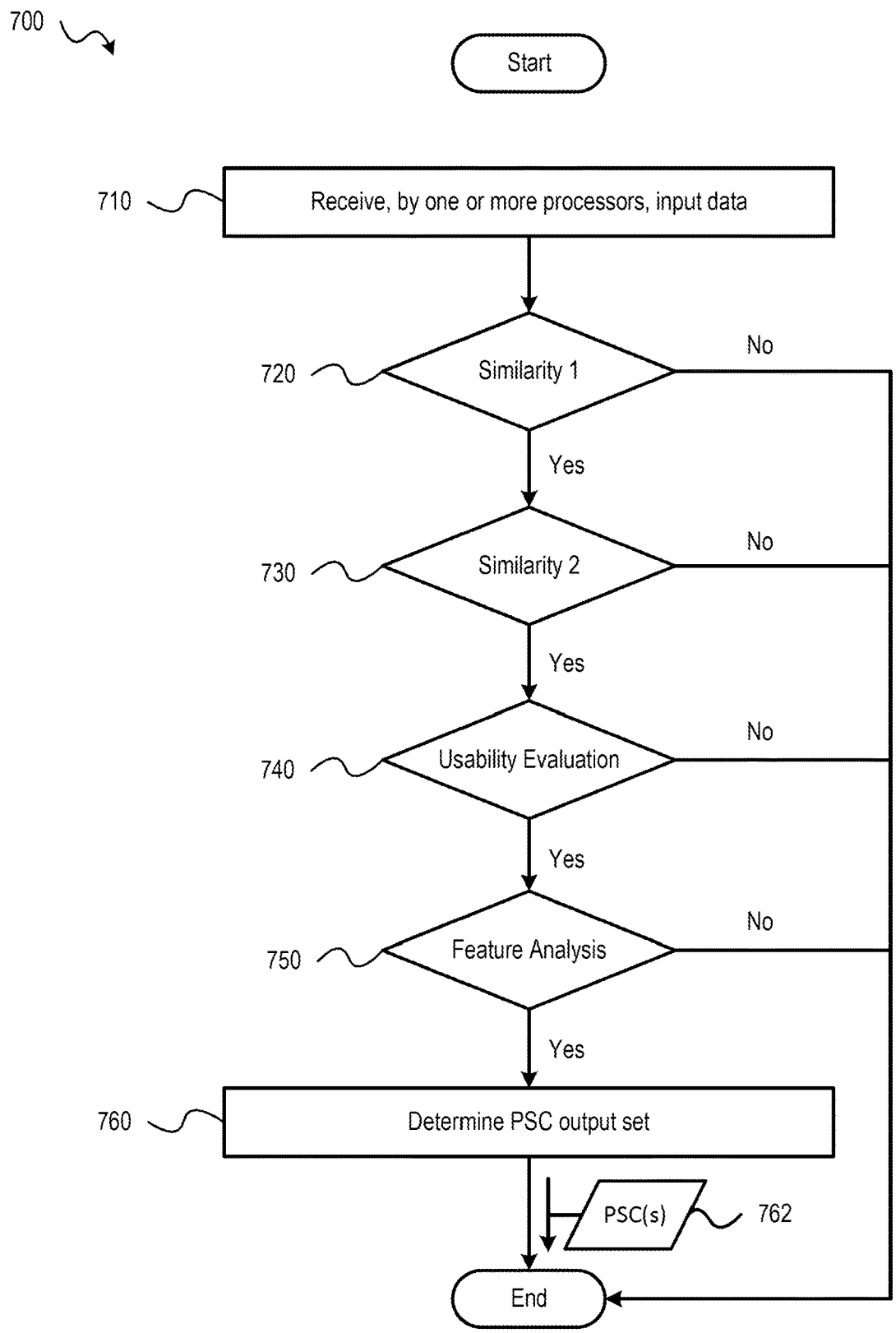
FIG. 7 is another block diagram illustrating additional exemplary aspects for composing a system architecture using packaged software capabilities in accordance with the present disclosure.

Referring to FIG. 7, which shows a flow diagram of an exemplary method for identifying packaged software capabilities in accordance with the present disclosure is shown as a flow 700. It is to be appreciated that the flow 700 may be performed by a discovery engine (e.g., the discovery engines 228 of FIG. 2 or the discovery engine 160 of FIG. 6, which may be incorporated into the integration hub 124 of FIG. 1). As shown in FIG. 7, at step 710, the flow 700 includes receiving, by one or more processors, input data. At step 720, the flow 700 includes evaluate a similarity between code snippets and search parameters. In an aspect, the step 720 may be performed as described above with reference to the code analyzer 614 of FIG. 6. The similarities between the code snippets and the search parameters may be evaluated to determine whether the similarities indicate a best fit for one or more packaged software capabilities. For example, where the similarity is a cosine similarity, a best fit may be determined when the cosine similarity is equal to or near 0 (e.g., within X % of 0). Any packaged software capabilities determined, at step 720, to not be a best fit may be ignored.

At step 730, the similarity between the search parameters and documentation for the packaged software capabilities may be evaluated. In an aspect, the evaluation of the similarity between the search parameters and documentation for the packaged software capabilities may be performed as described above with reference to the document analyzer 616. For example, in step 730 a similarity score representative of the comparison of the documentation associated with the packaged software capabilities and the search parameters may be generated. A best fit packaged software capability may be identified when the similarity score for documentation corresponding to a package software capability and the search parameters satisfies a threshold similarity score (e.g., a threshold similarity of 80%, 85%, 90%, 95%, 100%, or another threshold value providing satisfactory performance). In an aspect, any packaged software capabilities determined, at step 730, to not be a best fit may be ignored. In an aspect, step 730 may only evaluate documentation of packaged software capabilities determined to be a best fit at step 720, thereby eliminating any packaged software capabilities that are not a best fit from further consideration. This may reduce the computational resources required to obtain the search results and improve the response time for providing search results to the user.

At step 740, the usability of one or more packaged software capabilities may be evaluated. For example, the usability of packaged software capabilities may be evaluated as described above with reference to the usability analyzer 618 of FIG. 6 and a usability score (e.g., U in Equation 1) may be obtained. The usability score for each packaged software capability may be compared to a usability threshold indicative of good usability. Packaged software capabilities satisfying the usability threshold may be identified as a best fit for the search parameters. In an aspect, any packaged software capabilities determined, at step 730, to not be a best fit may be ignored. In an aspect, step 740 may only evaluate documentation of packaged software capabilities determined to be a best fit at step 730, thereby eliminating any packaged software capabilities that are not a best fit from further consideration. This may reduce the computational resources required to obtain the search results and improve the response time for providing search results to the user.

At step 750, the search parameters may be compared to product name and functionality information to determine whether the functionality provided by packaged software capabilities correspond to the search parameters. In an aspect, the comparison of the search parameters to the functionalities of a packaged software capability may be performed as described above with reference to the feature extractor 612. The comparison at step 750 may be utilized to evaluate whether the functions of the packaged software capabilities are sufficiently similar to the search parameters, which may indicate the functionality of the packaged software capability is a best fit based on the search parameters.

At step 760, an output set of packaged software capabilities 762 may be generated, which identifies the final set of best fit packaged software capabilities based on steps 720-750. The output set of packaged software capabilities 762 may be returned to the user as a set of search results, which may be displayed in a graphical user interface. As a non-limiting example, the user interface may present the best fit packaged software capabilities identified in the output set of packaged software capabilities 762 as a list or grid, which may include interactive elements that may be activated to learn more details about each identified packaged software capability. From the interface the user may select one or more packaged software capabilities for deployment. As explained above, the one or more packaged software capabilities selected for deployment may activate other functionality, such as the above-described functionality for generating NFTs representing credentials establishing the user is authorized to deploy or install the selected packaged software capabilities (e.g., on the computing device 206 of FIG. 2).

As can be appreciated from the description above, the various functionalities and processes described above with reference to FIGS. 2-8 enable packaged software capabilities to be maintained in a central repository (e.g., the packaged software capabilities database 234 of FIG. 2) and searched based on parameters specified by a user to identify best fit packaged software capabilities that meet the needs of the user. Moreover, the flow of FIG. 7 provides for analysis of packaged software capabilities and search parameters to identify the best fit packaged software capabilities in a manner that may reduce the computational complexity of the search process (e.g., by eliminating any non-best fit packaged software capabilities determined in a previous step from consideration in a next step). In this manner, a user may be able to quickly identify packaged software capabilities that may be combined to develop new applications and functionality for deployment on a system without needed software developers or significant integration while ensuring best of class functionality if achieved.

As explained above, and returning to FIG. 2, the validator 222 may be configured to determine interoperability of packaged software capabilities. The process of validating interoperability of packaged software capabilities may be similar to the above-described processes for discovering or searching packaged software capabilities but may utilize different techniques to evaluate interoperability instead of comparing packaged software capabilities to search parameters.

For example, the validator 222 may be configured to evaluate the uniqueness of a packaged software capability submitted to the platform. The uniqueness of the packaged software capability may provide a measure of whether packaged software capabilities that have been already submitted to the platform provide the same functionality as the newly submitted package capability. This may promote development of new or unique packaged software capabilities, thereby increasing the number of features and functionality that may be provided via packaged software capabilities and expand the packaged software ecosystem, as well as the types of applications and systems that may be developed and deployed using packaged software capabilities.

The validator 222 may utilize natural language processing and topic modelling to evaluate the uniqueness of packaged software capabilities. For example, natural language processing may be used to extract terms from documentation associated with packaged software capabilities, such as nouns and phrases that may be descriptive of the functionality and features provided by each submitted packaged software capability. The extracted terms may be processed using classification and topic modelling techniques. For example, the classifier may be configured to perform classification of packaged software capabilities based on the extracted terms, which may provide a broad categorization of the packaged software capability. The topic modelling may be configured to perform topic-based classification and topic-based feature extraction. The topic-based classification may be configured to classify one or more topics identified based on the extracted terms, which may identify topics related to the functionality provided by the packaged software capability, and the topic-based feature extraction may be configured to identify features of the packaged software capability. The term-based classification, topic-based classification, and extracted features may form a set of triples that characterize features and functionality for each packaged software capability. As can be appreciated from the foregoing, comparison of triples associated with different packaged software capabilities provides insights into the uniqueness of the packaged software capabilities (e.g., packaged software capabilities providing similar functionalities and features may have similar triples).

The validator 222 may also be configured to evaluate compliance with packaged software capability standards and/or guidelines. For example, the standards or guidelines (also referred to herein as specifications) may specify hardware requirements (e.g., hardware that should be supported by packaged software capabilities), infrastructure requirements (e.g., cloud services supported, operating systems, browser support, etc.), copyright notices, ownership details, usage rights (e.g., licensing terms, including usage and distribution rights and restrictions), data privacy requirements (e.g., privacy regulations compliance, data collection, storage, and processing practices, and consent mechanisms), security requirements (e.g., authentication measures, encryption measures, authorization mechanisms, and measures to protect against unauthorized access, data breaches, security vulnerabilities), any industry-specific regulatory requirements or standards that must be adhered to, and other aspects associated technology dependencies of packaged software capabilities. It is noted that the exemplary standards and guidelines described above have been provided for purposes of illustration, rather than by way of limitation and that additional requirements, guidelines, and standards may be applied if desired. In an aspect, the validator 222 may determine the technology dependencies of packaged software capabilities with respect to the standards in a manner similar to the documentation analyzer, but instead of analyzing documentation and search parameters, the validator 222 may compare the documentation associated with a packaged software capability to the standards. As an example, the validator 222 may utilize boosting, bagging, stacking, and ensemble learning to evaluate standards compliance with respect to technology dependencies.

The compliance evaluation may also be configured to provide a co-existence measurement for each packaged business capability. The co-existence measurement may indicate compliance of the packaged software capability with required or highly recommended features, such as standard logging and monitoring options compatible with operations tooling, as well as security standards, authentication/authorization standards, and the like. In an aspect, the co-existence measurement may be determined using BERT sentence embedding and cosine similarity.

For example, an input dataset may be presented to a BERT model for performing a compliance check with respect to applicable compliance requirements. The input dataset may be obtained from information associated with packaged software capabilities, such as text descriptions of the packaged software capabilities, compliance labels, or other data sources. Natural language processing techniques (e.g., stemming, lemmatization, tokenization, etc.) may be applied to the input dataset to produce tokenized data that encodes the input dataset in a form that may be interpreted or evaluated by the BERT model. As an example, the pre-processing of the input dataset may split text data into sub-words (e.g., using WordPiece tokenization) and the tokens may be converted into numerical representations (e.g., word embeddings) the BERT model can understand.

The BERT model may be trained and tuned to perform compliance classification. For example, a classification layer of the BERT model may be configured and trained to perform binary classification, such as to classify the input dataset as being compliant or non-compliant with applicable standards and/or guidelines. During tuning weights of the BERT model may be adjusted to improve compliance predictions an improve overall model accuracy. A dataset used for training the BERT model may be divided into training, validation, and test datasets. The training dataset is used to perform training of the BERT model using optimization techniques (e.g., an Adam optimizer) and loss functions (e.g., binary cross-entropy) may be used to perform fine tuning. The performance of the trained BERT model may be evaluated using the validation set based on a variety of metrics (e.g., accuracy, recall, precision, F1 score, and the like). Hyperparameters of the BERT model (e.g., learning rate, batch size, number of epochs, etc.) may be fine-tuned to achieve optimal performance. The test dataset may be used to assess the BERT model's performance and generalization capability. For example, the test dataset may be processed using the BERT model to generate predictions with respect to compliance of one or more packaged software capabilities. Attention visualization and other techniques may be utilized to understand which parts of the input dataset text influenced the compliance predictions and provide explanations where the prediction indicates non-compliance.

The validator 222 may also be configured to perform cataloging according to one or more standards. The cataloging may be configured to organize the packaged software capabilities into a hierarchy, such as to categorize them by industry, functionality, compatibility, and the like. In an aspect, a convolutional recurrent neural network (CRNN) may be used to categorize the packaged software capabilities. A CRNN combines convolutional layers (typically used for image processing) with recurrent layers (commonly used for sequential data) and may be used for tasks that involve both spatial information (e.g., images) and sequential information (like text). Cataloging the capabilities of packaged software using a CRNN involves understanding the textual information on software packaging and potentially images.

Data Collection and Preparation: Gather a dataset that includes images of packaged software and their corresponding textual descriptions or labels outlining their capabilities. Preprocess images by resizing & normalizing them. Process text by tokenizing it into words/sub-words. Network Architecture: Design the CRNN architecture to handle both image data and text data. The convolutional layers will analyze the images, capturing visual features and patterns. The recurrent layers will process the textual information, capturing the sequence of capabilities. Image Feature Extraction: Pass the images through the convolutional layers to extract relevant visual features. These features can capture aspects of the software packaging, such as logos, icons, or other visual cues. 4. Text Processing: Process the text data using recurrent layers (such as LSTM or GRU) to capture the sequence of capabilities described on the packaging. We can use techniques like word embeddings to represent words as numerical vectors. 5. Combining Modalities: Concatenate/merge the features extracted from the image convolutional layers and text recurrent layers. This combined representation captures both the visual and textual information. 6. Fully Connected Layers: Add fully connected layers after the combined features to further process and transform the data. The final layers can be designed for the specific cataloguing task you're aiming to accomplish. 7. Training and Evaluation: Split your dataset into training and validation sets. Train the CRNN architecture using both the image and text data as inputs and the desired software capabilities as labels. Evaluate trained CRNN on a separate test dataset to assess its performance in cataloging s/w capabilities. Use appropriate evaluation metrics such as accuracy, precision, recall, and F1-score. 8. Interpretability: Utilize techniques like attention mechanisms to visualize which parts of the image and text the model is focusing on when making capability predictions. 9. Deployment and Maintenance: Deploy the trained CRNN model in software cataloging pipeline to automatically analyze packaged software capabilities and continuously monitor and maintain the model's performance by periodically. It's important to consider data privacy and ethical implications, if the packaged s/w includes sensitive information.

Using a CRNN (Convolutional Recurrent Neural Network) for cataloging the capabilities of packaged software offers several benefits due to its ability to handle both image and text data simultaneously. Here are some advantages: Multimodal Information Fusion: CRNNs are adept at combining information from different modalities, such as images and text. They can capture relationships between visual features from images and textual descriptions of capabilities, providing a holistic understanding of the software. Handling Both Image and Text Data: CRNNs allow to process images and text within the same model architecture. This is particularly useful for cataloging software, as you can leverage both the visual appearance of packaging and the textual descriptions of capabilities. Contextual Understanding: Recurrent layers in CRNNs enable the model to capture sequential dependencies in textual data. This helps the model understand the context of the capabilities described in the packaging text. Comprehensive Feature Extraction: Convolutional layers in CRNNs can capture visual features from images, such as logos, icons, and design elements on software packaging. These visual cues can be relevant indicators of software capabilities. 5. Enhanced Accuracy and Generalization: Combining information from multiple modalities often leads to more accurate predictions. CRNNs' ability to capture visual and textual cues can result in a more comprehensive understanding of software capabilities. 6. Attention and Interpretability: CRNNs can incorporate attention mechanisms that highlight specific parts of images and text that contribute to the model's predictions. This provides insights into how the model makes decisions, making it more interpretable. 7. Adaptability to Various Packaging Styles: CRNNs can adapt to different packaging designs and types by learning common visual features and textual patterns. Despite these benefits, it's important to acknowledge some challenges, including the need for labeled multimodal data, potential computational complexity, and the need for careful hyperparameter tuning. However, given the advantages CRNNs offer in handling complex, mixed-format data like software packaging, they can be a powerful tool for accurate and comprehensive software capability cataloging.

Using the above-describe functionality, the validator 222 may evaluate the interoperability of packaged software capabilities. Packaged software capabilities that meet the required level of interoperability may be stored in the packaged software capability database 234 where they may be made available for distribution.

As shown above, the systems and methods described above with reference to FIGS. 1-8 provide a platform that supports an ecosystem for developing and distributing packaged software capabilities. The ecosystem provided by platforms designed in accordance with the concepts described herein may also enable rapid development and deployment of new functionality to computing systems and environments through the creation of applications and computing functionality built on packaged software capabilities, rather than using stand-alone software development and integration techniques. The platform provides robust and automated mechanisms for validating the interoperability and features of packaged software capabilities and for organizing them into a framework that enables monetization of packaged software capabilities.

Furthermore, by utilizing a blockchain and NFTs to manage distribution and access authorization for packaged software capabilities, the disclosed systems and methods provide an immutable and auditable record of all transactions involving packaged software capabilities and distribution. Such features may enable the platform to operate in a self-healable manner in which packaged software capabilities may be monitored for updates. When updates occur, notifications may be transmitted to entities associated with deployed software package capabilities to notify the entities of updates and/or new features available via packaged software capabilities. In an aspect, smart contracts may be used to push updates to deployed software package capabilities automatically. Additionally, by utilizing NFTs and smart contracts, the blockchain may provide better control of authorization and access to packaged software capabilities, such as by revoking authorizations associated with NFTs when a license to use a software package capability is revoked.

Another advantage provided by the systems and methods disclosed herein is the ability to automatically organize packaged software capabilities into a hierarchical manner that supports searching packaged software capabilities to identify best fits to features specified as search parameters by a user (e.g., information technology (IT) personnel, etc.). The search capabilities may ensure that users are able to quickly locate best fit packaged software capabilities and may promote rapid deployment of new functionality to existing systems with little or not integration required. For example, new technologies may be developed by simply deploying multiple packaged software capabilities without requiring custom software development and integration. Moreover, the packaged software capabilities may promote reuse of existing packaged software capabilities (e.g., the features and functionality of a packaged software capability may be utilized by different types of systems and industries, such as enabling a payment processing functionality to be deployed in web applications, retail point of sale devices, mobile payments, and other situations where payment functionality may be desired). The search capabilities, as well as the intelligent matching of search parameters to features and functionality of packaged software capabilities to identify best fit technologies, also promotes rapid adoption across industries.

The disclosed platform also provides a mechanism for monetizing packaged software capabilities in a manner that promotes intelligent packaged software capability design. For example, by evaluating the uniqueness of packaged software capabilities the platform promotes development of unique or new packaged software capabilities, further enhancing the number of features and functionality that may be provided by the platform. This also has the side effect of promoting more efficient use of resources used to develop packaged software capabilities as different developers may be incentivized to focus their efforts on providing new features and functionality to the packaged software capabilities ecosystem, rather than attempting to build their own version of an existing packaged software capability.

Figure 9:
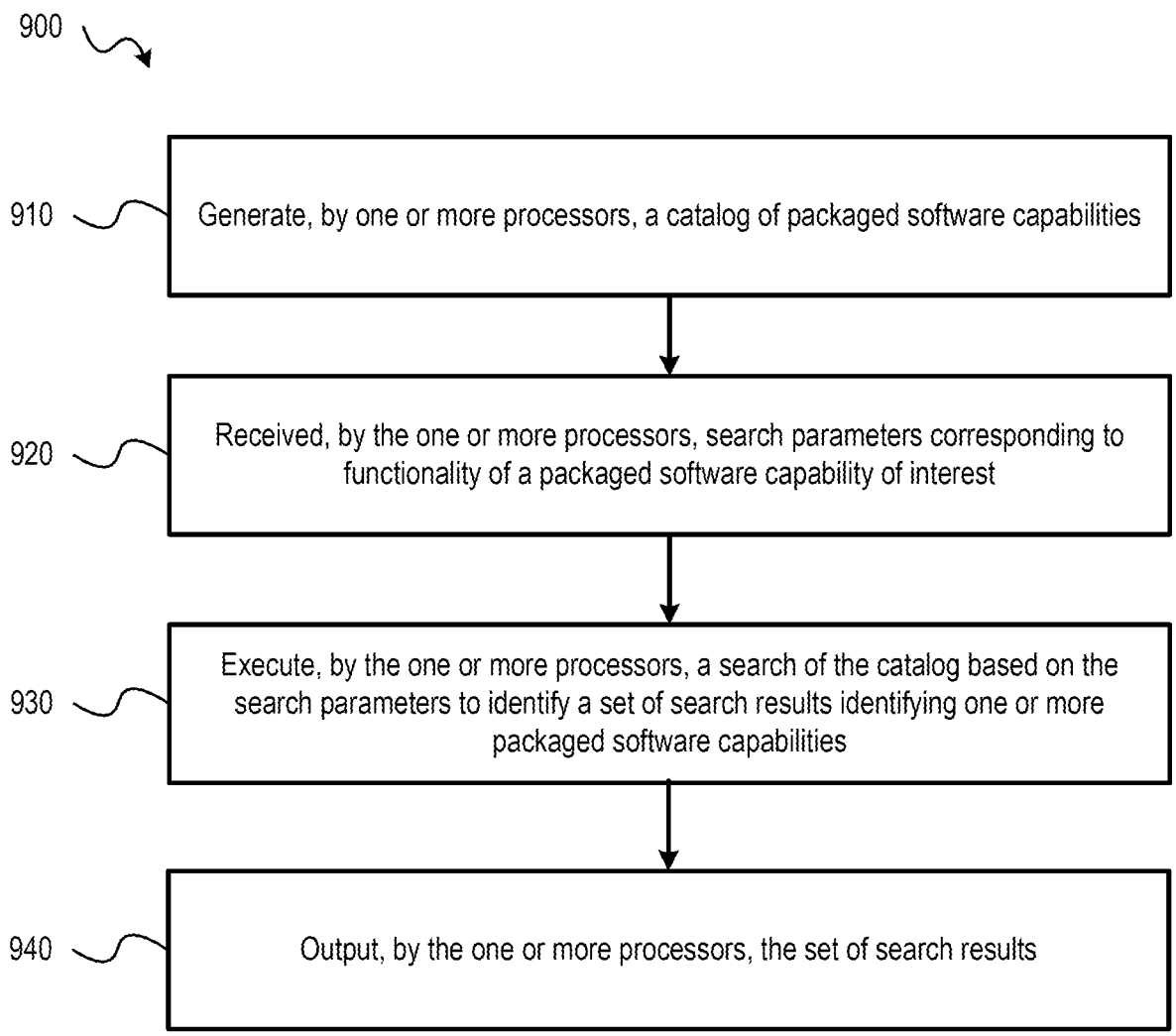
FIG. 9 is a flow diagram of an exemplary method for composing a system architecture using packaged software capabilities in accordance with the present disclosure.

Referring to FIG. 9, a flow diagram of an exemplary method for composing a system architecture using packaged software capabilities in accordance with the present disclosure is shown as a method 900. In an aspect, operations of the method 900 may be stored as instructions (e.g., the instructions 116 of FIG. 1) that, when executed by one or more processors, cause the one or more processors to perform the steps of the method 900. It is noted that the method 900 may be performed by a computing device, such as the computing device 110 of FIG. 1 and may support a platform for cataloging, marketing, distributing, and maintaining packaged software capabilities in accordance with the concepts described herein.

At step 910, the method 900 includes generating a catalog of packaged software capabilities. In an aspect, the catalog of packaged software capabilities may correspond to the packaged software capabilities database 234 of FIG. 2.

At step 920, the method 900 includes receiving search parameters corresponding to functionality of a packaged software capability of interest and at step 930, executing a search of the catalog based on the search parameters to identify a set of search results identifying one or more packaged software capabilities. As explained in more detail above, the search may include: generating metrics associated with the packaged software capabilities in the catalog based on the search parameters; identifying candidate packaged software capabilities from among the catalog; and eliminating a portion of the candidate packaged software capabilities based at least in part on the metrics to produce a set of search results comprising a remaining portion of the candidate packaged software capabilities. In an aspect, the metrics may correspond to similarity metrics and the candidate packaged software capabilities may be identified and reduced to obtain the set of search results as described above with reference to FIGS. 2-8.

At step 940, the method 900 includes outputting the set of search results. As explained above, the search results may be output to a graphical user interface and a user may provide an input corresponding to selection of a packaged software capability included in the set of search results, such as a packaged software capability that is to be deployed on a remote system. In response to selection of the packaged software capability, a smart contract may be invoked and an NFT may be generated, where the NFT represents an authorization to deploy the selected packaged software capability to a computing environment or use the selected packaged software capability. In an aspect, a fee may be charged in exchange for generating the NFT and providing access to the selected packaged software capability. The fee may be shared between an operator of the distribution platform and a developer that created the NFT.

In addition to the exemplary features of the method 900 described, it is to be understood that the method 900 may include any of the functionality described herein with reference to FIGS. 1-8. For example, the method 900 may also provide functionality to evaluate interoperability of packaged software capabilities based on one or more standards, as described above with reference to the validator 222, and packaged software capabilities may be incorporated into the catalog based on the interoperability evaluation.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-9) include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an ASIC, a FPGA or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may also be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

The invention claimed is:

1. A method comprising:
generating, by one or more processors, a catalog of packaged software capabilities;
receiving, by the one or more processors, search parameters corresponding to functionality of a packaged software capability of interest;
executing, by the one or more processors, a search of the catalog based on the search parameters to identify a set of search results identifying one or more packaged software capabilities, wherein the search is configured to:
generate metrics associated with the packaged software capabilities in the catalog based on the search parameters;
identify candidate packaged software capabilities; and
eliminate a portion of the candidate packaged software capabilities based at least in part on the metrics to produce a set of search results comprising a remaining portion of the candidate packaged software capabilities; and
output, by the one or more processors, the set of search results,
wherein the candidate packaged software capabilities are identified based on comparison of code snippets to the search parameters and comparison of documentation associated with packaged software capabilities of the catalog, wherein the comparison is configured to measure a first similarity between the search parameters and the documentation and a second similarity between the search parameters and the code snippets.

2. The method of claim 1, further comprising:
receiving an input corresponding to selection of a packaged software capability included in the set of search results;
generating a non-fungible token (NFT) in response to the input, wherein the NFT represents an authorization to deploy the selected packaged software capability; and
deploying the selected packaged software capability to a computing environment.

3. The method of claim 2, wherein the NFT is generated via a smart contract and is recorded to a blockchain.

4. The method of claim 1, wherein the candidate packaged software capabilities are further identified based on comparison of features and functionality of the packaged software capability of the catalog to the search parameters.

5. The method of claim 4, wherein the candidate packaged software capabilities are further identified based on usability metrics associated with packaged software capability of the catalog to the search parameters.

6. The method of claim 1, further comprising:
evaluating interoperability of a first packaged software capability based on one or more standards; and
incorporating the first packaged software capability into the catalog based on the evaluation of the interoperability of the first packaged software capability.

7. A system comprising:
a memory storing a catalog of packaged software capabilities;
one or more processors communicatively coupled to the memory, the one or more processors configured to:
receive search parameters corresponding to functionality of a packaged software capability of interest;
execute a search of the catalog based on the search parameters to identify a set of search results identifying one or more packaged software capabilities, wherein the search is configured to:
generate metrics associated with the packaged software capabilities in the catalog based on the search parameters;
identify candidate packaged software capabilities; and
eliminate a portion of the candidate packaged software capabilities based at least in part on the metrics to produce a set of search results comprising a remaining portion of the candidate packaged software capabilities; and
output, by the one or more processors, the set of search results,
wherein the candidate packaged software capabilities are identified based on comparison of code snippets to the search parameters and comparison of documentation associated with packaged software capabilities of the catalog, wherein the comparison is configured to measure a first similarity between the search parameters and the documentation and a second similarity between the search parameters and the code snippets.

8. The system of claim 7, wherein the one or more processors are configured to:
receive an input corresponding to selection of a packaged software capability included in the set of search results;
generate a non-fungible token (NFT) in response to the input, wherein the NFT represents an authorization to deploy the selected packaged software capability; and
deploy the selected packaged software capability to a computing environment.

9. The system of claim 8, wherein the NFT is generated via a smart contract and is recorded to a blockchain.

10. The system of claim 7, wherein the candidate packaged software capabilities are further identified based on comparison of features and functionality of the packaged software capability of the catalog to the search parameters.

11. The system of claim 10, wherein the candidate packaged software capabilities are further identified based on usability metrics associated with packaged software capability of the catalog to the search parameters.

12. The system of claim 7, wherein the one or more processors are configured to:
evaluating interoperability of a first packaged software capability based on one or more standards; and
incorporating the first packaged software capability into the catalog based on the evaluation of the interoperability of the first packaged software capability.

13. A non-transitory computer-readable storage medium storing instructions that, when executed by one or more processors, cause the one or more processors to perform operations comprising:
generating a catalog of packaged software capabilities;
receiving search parameters corresponding to functionality of a packaged software capability of interest;
executing a search of the catalog based on the search parameters to identify a set of search results identifying one or more packaged software capabilities, wherein the search comprises:
generating metrics associated with the packaged software capabilities in the catalog based on the search parameters;
identifying candidate packaged software capabilities; and
eliminating a portion of the candidate packaged software capabilities based at least in part on the metrics to produce a set of search results comprising a remaining portion of the candidate packaged software capabilities; and
outputting the set of search results,
wherein the candidate packaged software capabilities are identified based on comparison of code snippets to the search parameters and comparison of documentation associated with packaged software capabilities of the catalog, wherein the comparison is configured to measure a first similarity between the search parameters and the documentation and a second similarity between the search parameters and the code snippets.

14. The non-transitory computer-readable storage medium of claim 13, the operations further comprising:
receiving an input corresponding to selection of a packaged software capability included in the set of search results;
generating a non-fungible token (NFT) in response to the input, wherein the NFT represents an authorization to deploy the selected packaged software capability; and
deploying the selected packaged software capability to a computing environment.

15. The non-transitory computer-readable storage medium of claim 14, wherein the NFT is generated via a smart contract and is recorded to a blockchain.

16. The non-transitory computer-readable storage medium of claim 13, wherein the candidate packaged software capabilities are identified based on:
a comparison of features and functionality of the packaged software capability of the catalog to the search parameters; and
usability metrics associated with packaged software capability of the catalog to the search parameters.

17. The non-transitory computer-readable storage medium of claim 13,
wherein the comparisons is further configured to measure a third similarity between the features and functionality of the packaged software capabilities of the catalog, and wherein the remaining portion of the candidate packaged software capabilities correspond to packaged software capabilities satisfying a first threshold corresponding to the first similarity, a second threshold corresponding to the second similarity, a third threshold corresponding to the third similarity, and a threshold usability metric.

18. The non-transitory computer-readable storage medium of claim 13, the operations further comprising:
evaluating interoperability of a first packaged software capability based on one or more standards; and
incorporating the first packaged software capability into the catalog based on the evaluation of the interoperability of the first packaged software capability.

\* \* \* \* \*